United States Patent
Shimizu et al.

(10) Patent No.: US 10,739,440 B2
(45) Date of Patent: Aug. 11, 2020

(54) LIDAR COVER

(71) Applicant: FALTEC Co., Ltd., Kanagawa (JP)

(72) Inventors: Yusuke Shimizu, Chiba (JP); Kazuki Yamaguchi, Yokohama (JP)

(73) Assignee: FALTEC Co., Ltd., Kanagawa (JP)

( * ) Notice: Subject to any disclaimer, the term of this patent is extended or adjusted under 35 U.S.C. 154(b) by 78 days.

(21) Appl. No.: 16/188,170

(22) Filed: Nov. 12, 2018

(65) Prior Publication Data

US 2019/0146063 A1   May 16, 2019

(30) Foreign Application Priority Data

Nov. 14, 2017  (JP) .................... 2017-218897

(51) Int. Cl.
| | | |
|---|---|---|
| B32B 3/02 | (2006.01) | |
| G01S 7/481 | (2006.01) | |
| G02B 1/14 | (2015.01) | |
| G01S 17/93 | (2020.01) | |
| G01S 17/931 | (2020.01) | |

(52) U.S. Cl.
CPC ........... G01S 7/4811 (2013.01); G01S 7/4813 (2013.01); G01S 17/93 (2013.01); G01S 17/931 (2020.01); G02B 1/14 (2015.01)

(58) Field of Classification Search
CPC ......... G02B 1/14; G01S 17/88; G01S 17/931; G01S 7/4811; G01S 7/4813; G01S 7/4817

See application file for complete search history.

(56) References Cited

FOREIGN PATENT DOCUMENTS

| | | |
|---|---|---|
| EP | 3104190 A1 | 12/2016 |
| JP | 2004198617 A | 7/2004 |
| JP | 2010243436 A | 10/2010 |

OTHER PUBLICATIONS

European Search Report for Application No. EP 18205579.8 dated Apr. 23, 2019.

*Primary Examiner* — Elizabeth E Mulvaney

(74) *Attorney, Agent, or Firm* — Moser Taboada

(57) ABSTRACT

A lidar cover of the invention covers a lidar unit mounted on a vehicle and is capable of transmitting measurement light of the lidar unit therethrough. The lidar cover includes: a transparent layer that allows visible light and the measurement light to transmit therethrough; and a colored layer that is disposed at a lidar unit side of the transparent layer and includes a low-transmittance region having a first transmittance of the measurement light and a high-transmittance region having a second transmittance of the measurement light higher than the first transmittance of the low-transmittance region.

6 Claims, 5 Drawing Sheets

LIDAR COVER

CROSS REFERENCE TO RELATED APPLICATIONS

This application claims priority from Japanese Patent Application No. 2017-218897 filed on Nov. 14, 2017, the contents of which are incorporated herein by reference in their entirety.

BACKGROUND OF THE INVENTION

Field of the Invention

The present invention relates to a lidar cover.

Description of the Related Art

In recent years, due to an increase in safety consciousness or the like, a lidar unit (Light Detection and Ranging, Laser Imaging Detection and Ranging) for detecting an obstacle or the like around a vehicle is increasingly mounted on the vehicle. The lidar unit emits measurement light such as infrared light and receives reflected light thereof, and thereby acquires data indicating the distance to an object such as an obstacle or the shape of the object. In the case of mounting the above-described lidar unit on a vehicle, a lidar cover may be provided in front of the lidar unit in order to, for example, protect the lidar unit. For example, Japanese Unexamined Patent Application, First Publication No. 2004-198617 discloses a lidar cover having metallic luster due to a cold mirror layer. Additionally, Japanese Unexamined Patent Application, First Publication No. 2010-243436 discloses a lidar cover having metallic luster due to a germanium (Ge) layer. Moreover, a black lidar cover that allows infrared light to transmit therethrough is also known.

When the lidar cover is provided on a vehicle, for example, there is a need to improve the sense of unity with other parts without losing the sense of unity of the design of the entire vehicle. However, the aforementioned conventional lidar cover can only provide a predetermined metallic luster or black in color, and flexibility in design is extremely low. In recent years, it has been proposed that a lidar unit is provided on, for example, a bumper, a door mirror, a roof panel of a vehicle and the lidar unit is mounted so as to be directed in other directions. In such a case, there is a concern that the lidar cover that can only provide a predetermined metallic luster or black in color deteriorates the entire design.

SUMMARY OF THE INVENTION

The invention was made with respect to the above-described problems, and has an object to provide a lidar cover that is capable of transmitting measurement light of a lidar unit therethrough and improves flexibility in design thereof while being able to transmit measurement light therethrough.

In order to solve the above-described problems, the invention employs the following configurations.

An aspect of the invention provides a lidar cover that covers a lidar unit mounted on a vehicle and is capable of transmitting measurement light of the lidar unit therethrough. The lidar cover includes: a transparent layer that allows visible light and the measurement light to transmit therethrough; and a colored layer that is disposed at a lidar unit side of the transparent layer and includes a low-transmittance region having a first transmittance of the measurement light and a high-transmittance region having a second transmittance of the measurement light higher than the first transmittance of the low-transmittance region.

In the lidar cover of the aspect of the invention, the high-transmittance region may be an opening formed at the colored layer or a thin layer having a layer thickness thinner than that of the low-transmittance region.

In the lidar cover of the aspect of the invention, a plurality of the high-transmittance regions may align in a vertical direction, and each high-transmittance region extends in a horizontal direction.

The lidar cover of the aspect of the invention may further include a protective layer that is formed on a surface of the transparent layer which is on a side opposite to the lidar unit, protects the transparent layer, and that allows visible light and the measurement light to transmit therethrough.

The lidar cover of the aspect of the invention may further include a plurality of areas in which proportions of the high-transmittance region to the low-transmittance region are different from each other.

In the lidar cover of the aspect of the invention, in one of the areas which is disposed so as to face a light receiver of the lidar unit, a proportion of the high-transmittance region to the low-transmittance region may be higher than that of the other of the areas.

In the lidar cover of the aspect of the invention, the areas may have an upper area and a lower area, and in the upper area, a proportion of the high-transmittance region to the low-transmittance region may be lower than that of the lower area.

Effects of the Invention

According to the invention, the lidar cover includes the colored layer disposed at the lidar unit side of the transparent layer. Consequently, according to the invention, the colored layer can be visible from the opposite side of the lidar unit through the transparent layer. Furthermore, it is possible to apply an optional color or the like to the lidar cover by optionally selecting a color or the like of the colored layer. According to the invention, the colored layer has the low-transmittance region having a first transmittance of the measurement light and the high-transmittance region having a second transmittance of the measurement light higher than the first transmittance of the low-transmittance region. Because of this, the low-transmittance region can cause an external person to be clearly and visually aware of the color or the like of the colored layer, and the high-transmittance region can ensure transmittivity of the measurement light. As a result, according to the invention, it is possible to provide the lidar cover that is capable of transmitting measurement light of a lidar unit therethrough and improves flexibility in design thereof while being able to transmit measurement light therethrough.

DETAILED DESCRIPTION OF THE INVENTION

Hereinafter, a lidar cover according to an embodiment of the invention will be described with reference to drawings. In these drawings which are utilized in the following explanation, appropriate changes have been made in the scale of the various members, in order to represent them at scales at which they can be easily understood.

Figure 1A:
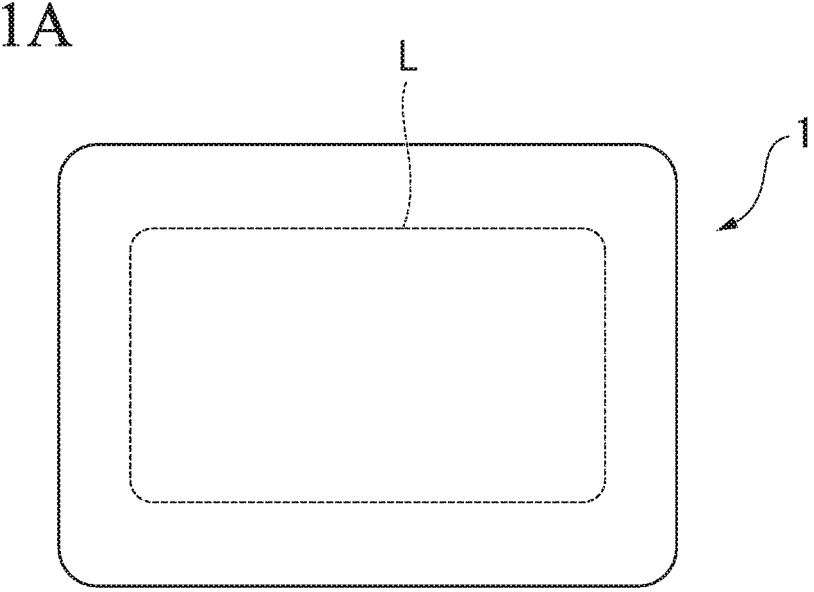
FIG. 1A is a front view showing a schematic configuration including a lidar cover according to an embodiment of the invention.
Figure 1B:
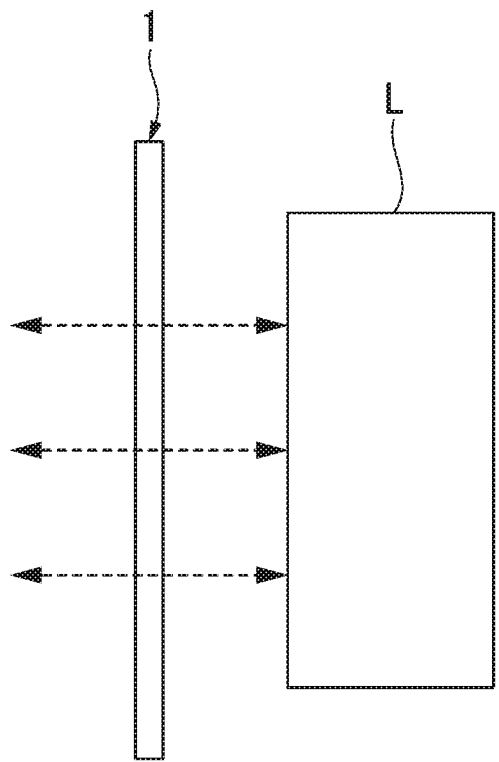
FIG. 1B is a side view showing a schematic configuration including the lidar cover according to the embodiment of the invention.

FIG. 1A is a front view showing a schematic configuration including a lidar cover 1 according to the embodiment, and FIG. 1B is a side view showing a schematic configuration including the lidar cover 1 according to the embodiment. The lidar cover 1 according to the embodiment is a cover member disposed so as to cover a lidar unit L mounted on a vehicle, and the lidar cover covers the outside of the vehicle. For example, in the case where the lidar unit L emits measurement light forward from the vehicle, the lidar cover 1 according to the embodiment is disposed in front of the lidar unit L. In the case where the lidar unit L emits measurement light to the right side of the vehicle, the lidar cover 1 according to the embodiment is disposed at the right of the lidar unit L. In the case where the lidar unit L emits measurement light to the left side of the vehicle, the lidar cover 1 according to the embodiment is disposed at the left of the lidar unit L. In the case where the lidar unit L emits measurement light rearward from the vehicle, the lidar cover 1 according to the embodiment is disposed at the rear of the lidar unit L. That is, the posture of the lidar cover 1 according to the embodiment which is provided on the lidar unit L is not particularly limited.

The lidar unit L covered with the lidar cover 1 according to the embodiment is a device that emits infrared light laser light or the like as measurement light and obtains a distance to an object or a shape of the object in accordance with reflected light of the measurement light. For example, the lidar unit L includes: an emitter that is provided with a light source generating the measurement light, an irradiating lens guiding the measurement light, or the like; a light receiver that is provided with a light receiving lens guiding reflected light incident thereto, a light receiving element converting the reflected light into an electrical signal, or the like; and a calculator that signal-processes the electrical signal output from the light receiver. Note that, a configuration of the lidar unit L is not particularly limited.

As shown in FIGS. 1A and 1B, the lidar cover 1 according to the embodiment is formed in a substantially rectangular plate shape and is disposed in a state where the back surface side thereof is directed to the lidar unit L. The above-described lidar cover 1 according to the embodiment is supported by other component which is not shown in the figure. Note that, the lidar cover 1 according to the embodiment does not need to be formed in a substantially rectangular shape. For example, in the case where the lidar cover 1 according to the embodiment is disposed so as to be fitted into an opening formed on other resin exterior component, the lidar cover 1 according to the embodiment is formed in a shape corresponding to the shape of the opening. For example, in the case where the aforementioned opening is formed in a circular shape, the shape of the lidar cover 1 according to the embodiment is a circular shape. In the case where the aforementioned opening is formed in a triangular shape, the shape of the lidar cover 1 according to the embodiment is a triangular shape. Furthermore, the front surface and the back surface of the lidar cover 1 according to the embodiment do not need to be a flat surface. For example, in the case where the lidar cover 1 according to the embodiment is provided integrally with a member having other curved surface, the front surface and the back surface of the lidar cover are each a curved surface so as to be on the same plane with respect to the surface of the other member. Moreover, for example, the overall shape of the lidar cover 1 according to the embodiment may be a shape of a resin exterior component. In such case, the lidar cover 1 according to the embodiment can be used as a resin exterior component.

Figure 2:
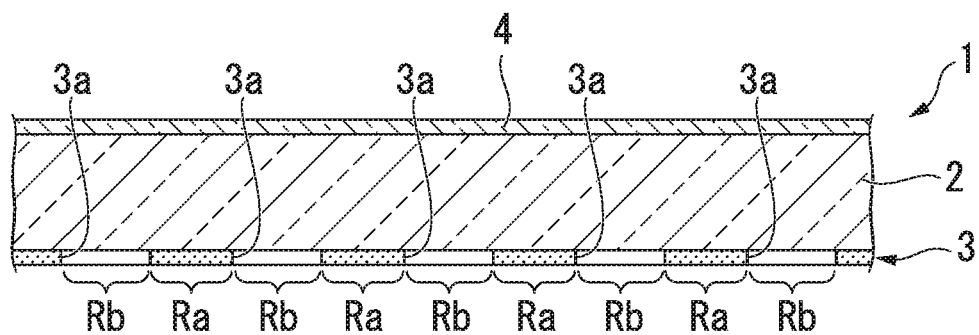
FIG. 2 is an enlarged cross-sectional view schematically showing the lidar cover according to the embodiment of the invention.

FIG. 2 is an enlarged cross-sectional view schematically showing the lidar cover 1 according to the embodiment. As shown in this drawing, the lidar cover 1 according to the embodiment includes: a transparent member 2 (transparent layer); an ink layer 3 (colored layer); and a protective layer 4. Note that, in FIG. 2, the upper side (the portion on which the protective layer 4 is disposed) is the outer side outside of the vehicle (i.e., the front surface side of the lidar cover 1 according to the embodiment), and the lower side (the portion on which the ink layer 3 is disposed) is the inner side of the vehicle (i.e., the back surface side of the lidar cover 1 according to the embodiment).

The transparent member 2 is a base layer that is capable of transmitting visible light therethrough and supports the ink layer 3 disposed on the back surface side of the transparent member such that the ink layer can be visible from the front surface side. Furthermore, the front surface of the transparent member 2 is a smooth surface in order to improve visibility of the ink layer 3 from the outside of the vehicle. Additionally, the transparent member 2 is capable of transmitting not only visible light but also measurement light therethrough. That is, the transparent member 2 is made of a material that is transparent with respect to visible light and measurement light (including a transparent colored material). The above-described transparent member 2 is made of a transparent synthetic resin material such as colorless PC (polycarbonate), PMMA (polymethylmethacrylate resin), or the like. Moreover, the above-described transparent member 2 has transmittances of visible light and the measurement light which are extremely higher than those of the ink layer 3.

The ink layer 3 is a colored layer adhesively fixed to the back surface of the transparent member 2 and is formed by drying ink materials including dye or pigment. The ink layer 3 is formed on the back surface of the transparent member 2 by a printing method such as a screen printing method. Ink materials used to form the above-described ink layer 3 are not particularly limited and are not limited to ink materials that do not allow measurement light to transmit therethrough. Ink materials that can allow measurement light to transmit therethrough can be used.

As shown in FIG. 2, the ink layer 3 has a plurality of openings 3a. These openings 3a are each a slit that is used to allow measurement light of the lidar unit L to transmit therethrough, penetrate through the ink layer 3 in a thickness direction, and cause the back surface of the transparent member 2 to be exposed. The above-described openings 3a are each provided so as to extend in the horizontal direction and align in the height direction thereof. It is preferable that a length of each opening 3a in a width direction orthogonal to a longitudinal direction be set to a length such that it is difficult for a person who is out of a vehicle to be visually aware of the openings. For example, the length of each opening is less than or equal to 1 mm.

The ink layer 3 allows measurement light to transmit therethrough on the regions on which the openings 3a are formed and shields measurement light on the regions on which the openings 3a are not formed. Consequently, in the ink layer 3, the regions on which the openings 3a are not formed are each a low-transmittance region Ra having a first transmittance of the measurement light, and the regions on which the openings 3a are formed are each a high-transmittance region Rb having a second transmittance of the measurement light higher than the first transmittance of the low-transmittance region Ra. That is, the ink layer 3 includes: the low-transmittance region Ra having a first transmittance of the measurement light; and the high-transmittance region Rb having a second transmittance of the measurement light higher than the first transmittance of the low-transmittance region Ra.

Additionally, the openings 3a forming the high-transmittance regions Rb are each provided so as to extend in the horizontal direction and align in the height direction thereof. That is, in the lidar cover 1 according to the embodiment, a plurality of the high-transmittance regions Rb align in the vertical direction, and each high-transmittance region extends in a horizontal direction.

The above-described ink layer 3 visually recognized from the front surface side of the transparent member 2 and thereby determines the color, texture, or the like of the lidar cover 1 according to the embodiment. Note that, since the ink layer 3 has the high-transmittance region Rb, the ink layer can be formed by use of optionally selected ink materials in accordance with a color, texture, or the like which is required for the lidar cover 1 according to the embodiment.

The protective layer 4 is formed on a surface (front surface) of the transparent member 2 on the opposite side of the lidar unit L and is a clear layer adhesively fixed to the front surface of the transparent member 2. The protective layer 4 is a thin layer that protects the front surface of the transparent member 2 and allows visible light and measurement light to transmit therethrough. The above-described protective layer 4 is formed by, for example, hard coating treatment for preventing the layer from being scratched or clear coating treatment using a urethane-based coating material. By the above-described protective layer 4, the lidar cover 1 according to the embodiment has scratch resistance or weatherability.

Figure 3A:
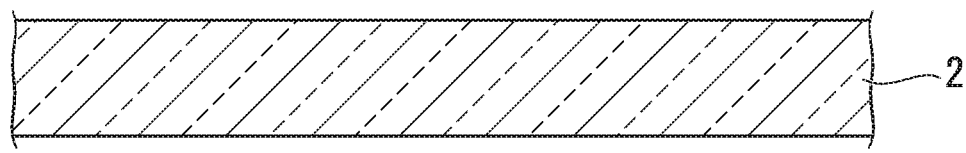
FIG. 3A is a schematic explanatory view showing a method of manufacturing the lidar cover according to the embodiment of the invention.

In the case of manufacturing the above-described lidar cover 1 according to the embodiment, firstly, as shown in FIG. 3A, the transparent member 2 is formed. For example, the transparent member 2 is formed by injection molding.

Figure 3B:
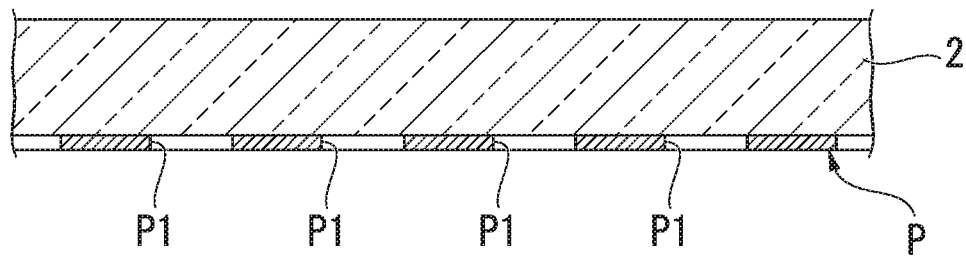
FIG. 3B is a schematic explanatory view showing the method of manufacturing the lidar cover according to the embodiment of the invention.
Figure 3C:
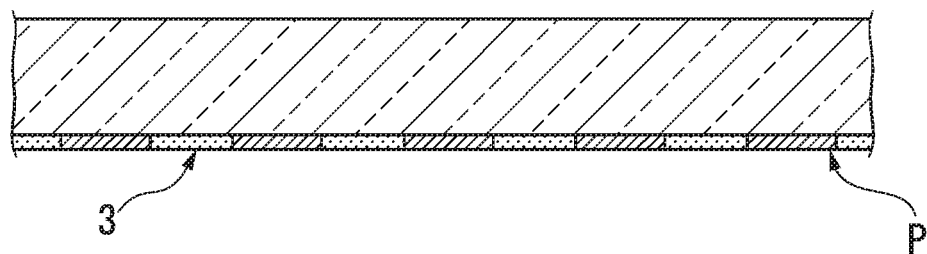
FIG. 3C is a schematic explanatory view showing the method of manufacturing the lidar cover according to the embodiment of the invention.

Next, as shown in FIG. 3B, a block P having openings P1 which is used to form the ink layer 3 is disposed with respect to the back surface of the transparent member 2. Thereafter, as shown in FIG. 3C, an ink material is disposed on the openings P1 of the block P, the material is dried, and the ink layer 3 is thereby formed. Finally, the front surface of the transparent member 2 (surface directed to outside of the vehicle) is subjected to coating treatment for improving scratch resistance, weatherability, or the like, and therefore the protective layer 4 (refer to FIG. 2) is formed. By the above-described steps, the lidar cover 1 according to the embodiment is manufactured.

According to the above-described embodiment, the lidar cover 1 is provided with the ink layer 3 disposed on the lidar unit side of the transparent member 2. Consequently, according to the lidar cover 1 of the embodiment, the ink layer 3 can be visible from the opposite side of the lidar unit L via the transparent member 2. Furthermore, it is possible to apply an optional color or the like to the lidar cover 1 by optionally selecting a color or the like of the ink layer 3. Moreover, according to the lidar cover 1 of the embodiment, the ink layer 3 includes: the low-transmittance region Ra having a first transmittance of the measurement light; and the high-transmittance region Rb having a second transmittance of the measurement light higher than the first transmittance of the low-transmittance region Ra. Because of this, the low-transmittance region Ra can cause an external person to be clearly and visually aware of the color or the like of the ink layer 3, and the high-transmittance region Rb can ensure transmittivity of the measurement light. As a result, the lidar cover 1 according to the embodiment can cause measurement light to transmit therethrough and improve flexibility in design thereof.

Furthermore, even in the case where the ink layer 3 is formed of a material that allows measurement light to transmit therethrough, by forming the openings 3a, it is possible to improve transmittance of the measurement light on the regions on which the openings 3a are formed. Even in the case where the ink layer 3 is formed of a material that allows measurement light to transmit therethrough, it is conceivable that the transmittance of the material is not sufficient. Consequently, according to the lidar cover 1 of the embodiment, even where the ink layer 3 allows measurement light to transmit therethrough, as a result of forming the openings 3a, the transmittance of the ink layer 3 with respect to the measurement light can be improved. Additionally, by adjusting the opening proportion of the openings 3a, the transmittance of the lidar cover 1 with respect to the measurement light is adjusted, and it is also possible to adjust output of the measurement light emitted through the lidar cover 1.

Moreover, in the lidar cover 1 according to the embodiment, the high-transmittance regions Rb are configured by the openings 3a formed on the ink layer 3. Accordingly, the high-transmittance regions Rb with a simple configuration can be formed.

Also, in the lidar cover 1 according to the embodiment, a plurality of the high-transmittance regions Rb align in the vertical direction, and each high-transmittance region extends in a horizontal direction. Generally, a lidar unit L mounted on a vehicle is disposed at a position lower than the head of a person walking or the like outside the vehicle. Because of this, a person outside the vehicle is aware of the lidar cover 1 so as to look down it. At this time, as compared with the case where the high-transmittance regions Rb extend in the vertical direction, in the case where the high-transmittance regions Rb extend in the horizontal direction, the inside of the opening 3a is less likely to be visually recognized by an external person. Therefore, according to the lidar cover 1 of the embodiment, over the entire area thereof, it is possible to prevent color contrasting, density or the like from being generated.

In addition, the lidar cover 1 according to the embodiment includes the protective layer 4 that is formed on a surface of the transparent member 2 which is on a side opposite to the lidar unit L, protects the transparent member 2, and allows visible light and measurement light to transmit therethrough. Thus, it is possible to improve scratch resistance or weatherability of the lidar cover 1 according to the embodiment and cause the lidar cover 1 according to the embodiment to be appropriately mounted on a vehicle.

As described above, while preferred embodiment of the invention have been described and shown above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

Figure 4A:
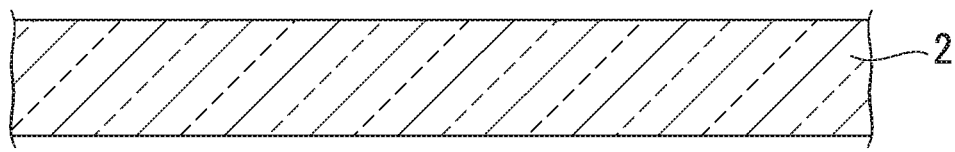
FIG. 4A is a schematic explanatory view showing a modified example of the method of manufacturing the lidar cover according to the embodiment of the invention.
Figure 4B:
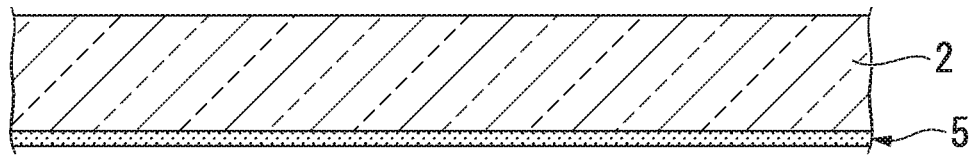
FIG. 4B is a schematic explanatory view showing a modified example of the method of manufacturing the lidar cover according to the embodiment of the invention.
Figure 4C:
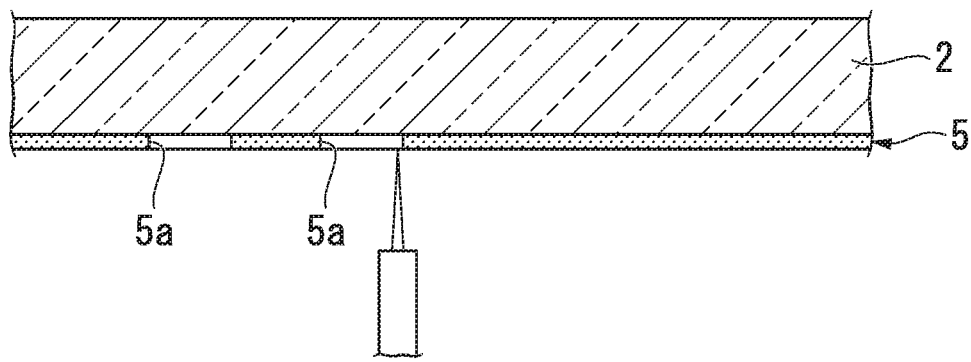
FIG. 4C is a schematic explanatory view showing a modified example of the method of manufacturing the lidar cover according to the embodiment of the invention.

In the aforementioned embodiment, for example, the method of forming the ink layer 3 by use of a screen printing method is adopted. However, the invention is not limited to this configuration. For example, a method can be adopted such that the transparent member 2 is formed as shown in FIG. 4A, a coating layer 5 serving as an entirely-coated layer is formed on the back surface of the transparent member 2 as shown in FIG. 4B, and next the coating layer 5 is patterned by laser light or the like and therefore openings 5a are formed as shown in FIG. 4C. By adopting the above method, instead of the ink layer 3, a configuration including the coating layer 5 (colored layer) having the openings 5a can be adopted.

Figure 5:
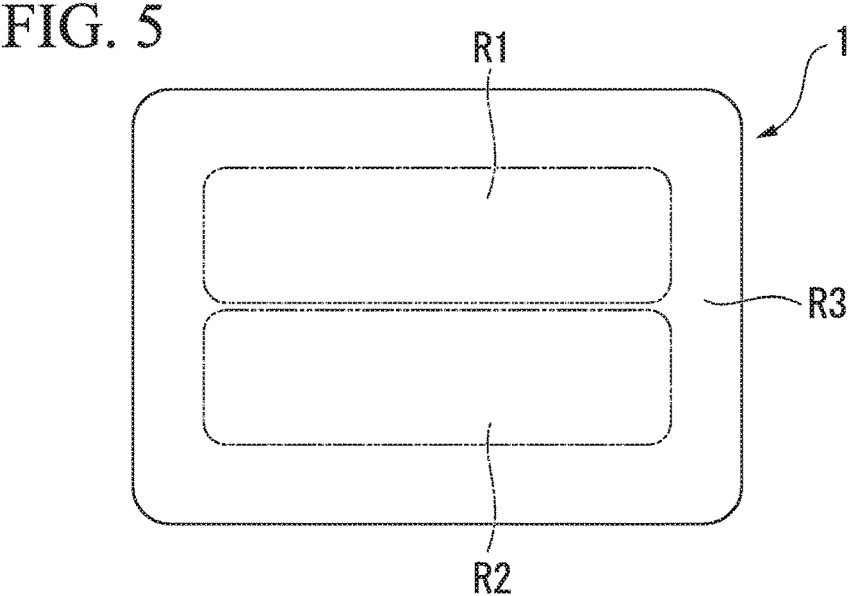
FIG. 5 is a front view showing a modified example of the method of manufacturing the lidar cover according to the embodiment of the invention.
Figure 6A:
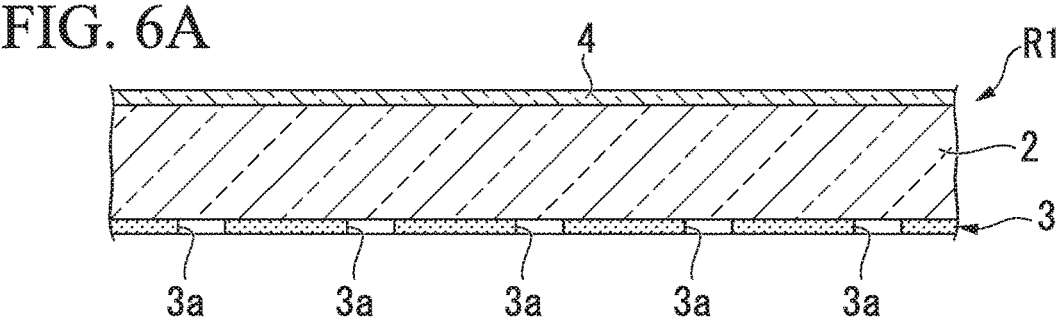
FIG. 6A is an enlarged cross-sectional view schematically showing each region of a modified example of the method of manufacturing the lidar cover according to the embodiment of the invention.
Figure 6B:
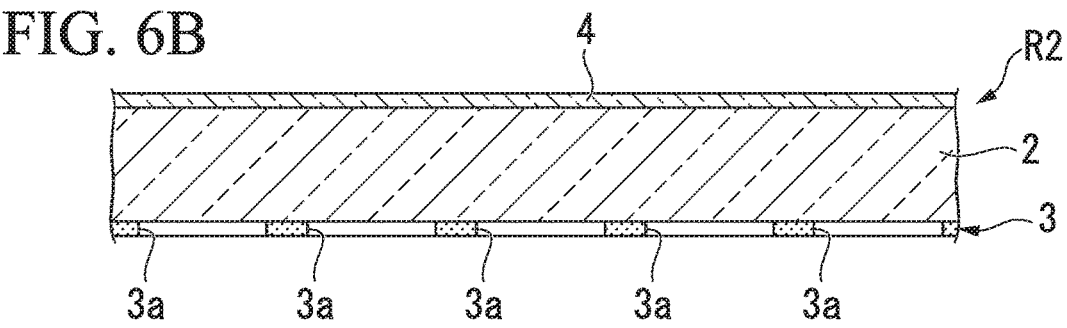
FIG. 6B is an enlarged cross-sectional view schematically showing each region of a modified example of the method of manufacturing the lidar cover according to the embodiment of the invention.
Figure 6C:
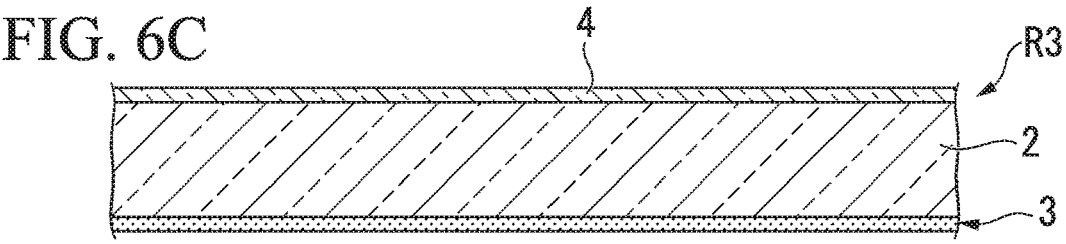
FIG. 6C is an enlarged cross-sectional view schematically showing each region of a modified example of the method of manufacturing the lidar cover according to the embodiment of the invention.

Furthermore, as the invention, a configuration can be adopted such that the lidar cover 1 according to the aforementioned embodiment has a plurality of areas in which the proportions of the high-transmittance regions Ra to the low-transmittance regions Rb are different from each other. For example, as shown in FIG. 5, the lidar cover 1 is separated into three areas. That is, a first area R1 (the other of the areas) is disposed so as to face an emitter of the lidar unit L, a second area R2 (one of the areas which is disposed so as to face a light receiver of the lidar unit) is disposed so as to face a light receiver of the lidar unit L, and a third area R3 (the other of the areas) surrounds the first area R1 and the second area R2. Furthermore, as shown in FIG. 6A, a width of the opening 3a of the first area R1 of the ink layer 3 is narrower than that of the second area R2. In addition, as shown in FIG. 6B, a width of the opening 3a of the second area R2 of the ink layer 3 is larger than that of the first area R1. Moreover, as shown in FIG. 6C, an entirely-coated layer such that the ink layer 3 does not have the openings 3a is formed on the third area R3. Consequently, the proportion of the high-transmittance region Rb to the low-transmittance region Ra gradually increase in the order of the third area R3, the first area R1, and the second area R2. That is, the proportion of the high-transmittance region Rb to the low-transmittance region Ra in the third area R3 is lowest in the areas. The proportion of the high-transmittance region Rb to the low-transmittance region Ra in the second area R2 is highest in the areas.

In the above-described lidar cover 1, the third area R3 is not necessary to transmit measurement light and reflected light therethrough. Therefore, as the ink layer 3 serves as the entirely-coated film, it is possible for an external person to be easily, clearly, and visually aware of the ink layer 3. Additionally, since the intensity of measurement light is greater than that of the reflected light in the first area R1, even where the proportion of the high-transmittance region Rb to the low-transmittance region Ra is lower than that of the second area R2, it is possible to obtain reflected light having sufficient intensity. Because of this, by the first area R1, it is possible to allow measurement light to transmit therethrough, and it is possible for an external person to be easily, clearly, and visually aware of the ink layer 3. Additionally, in the second area R2, by setting the proportion of the high-transmittance region Rb to the low-transmittance region Ra to be highest in the areas, it is possible to further reliably receive the reflected light by the light receiver of the lidar unit L.

Note that, in the case where the lidar cover 1 is separated into a plurality of areas as described above, it is preferable that a proportion of the high-transmittance region to the low-transmittance region in the upper area be lower than that in the lower area. Generally, a person outside the vehicle is aware of the lidar cover 1 so as to look down it. Therefore, by setting the proportion of the high-transmittance region to the low-transmittance region in the upper area to be lower, it is possible for an external person to be easily, clearly, and visually aware of the ink layer 3.

Figure 7:
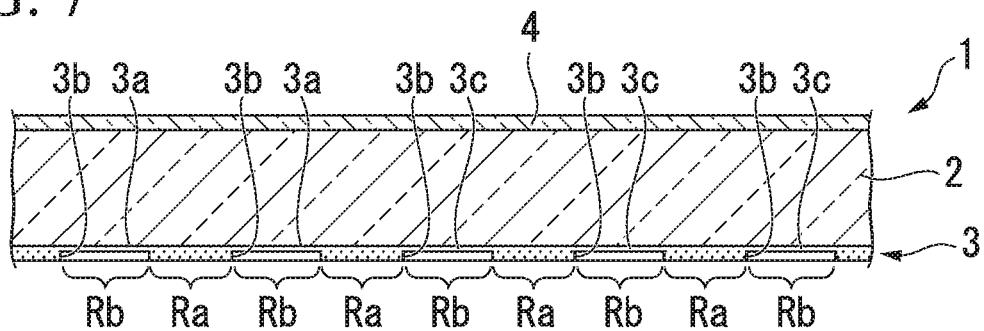
FIG. 7 is an enlarged cross-sectional view schematically showing a modified example of the lidar cover according to the embodiment of the invention.

Additionally, in the aforementioned embodiment, a configuration is explained in which the low-transmittance regions Ra and the high-transmittance regions Rb are formed on the ink layer 3 by forming the openings 3a on the ink layer 3. However, the invention is not limited to this configuration. For example, in the case where the ink layer 3 is formed of a material that can partially allow measurement light to transmit therethrough, as shown in FIG. 7, it is possible to achieve a configuration of the ink layer 3 including the low-transmittance regions Ra and the high-transmittance regions Rb also by forming grooves 3b instead of the openings 3a. In such case, a thin layer 3c having a layer thickness smaller than that of the low-transmittance region Ra functions as the high-transmittance region Rb.

Figure 8A:
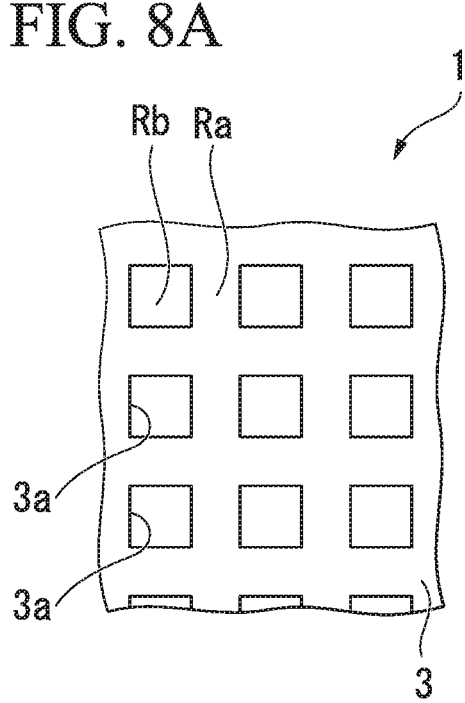
FIG. 8A is an enlarged front view partially and schematically showing a modified example of the lidar cover according to the embodiment of the invention.
Figure 8B:
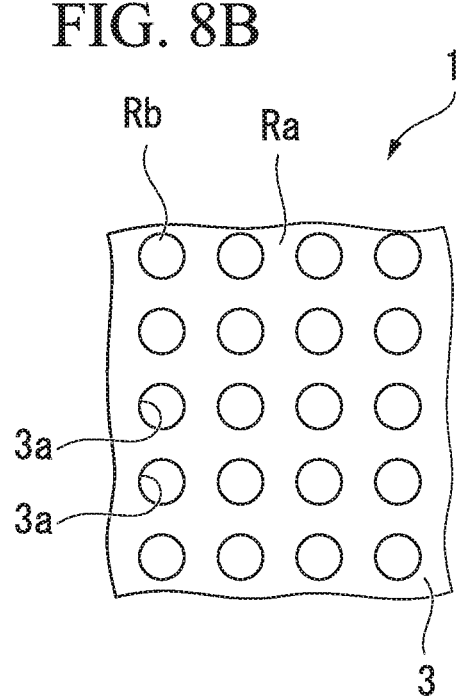
FIG. 8B is an enlarged front view partially and schematically showing a modified example of the lidar cover according to the embodiment of the invention.

Moreover, in the above-mentioned embodiment, a configuration is explained in which the low-transmittance regions Ra and the high-transmittance regions Rb are arrayed in a stripe pattern. However, the invention is not limited to this configuration. For example, as shown in FIG. 8A, a configuration can be adopted in which the low-transmittance region Ra extends in left, right, upper, and lower directions so as to form a grid pattern and a plurality of the high-transmittance regions Rb formed in a rectangular shape are surrounded by the low-transmittance region Ra. As shown in FIG. 8B, a configuration can be adopted in which the high-transmittance regions Rb are each formed in a circular shape.

What is claimed is:

1. A lidar cover that covers a lidar unit mounted on a vehicle and is capable of transmitting measurement light of the lidar unit therethrough, comprising:
    a transparent layer that allows visible light and the measurement light to transmit therethrough;
    a colored layer that is disposed at a lidar unit side of the transparent layer and includes a low-transmittance region having a first transmittance of the measurement light and a high-transmittance region having a second transmittance of the measurement light higher than the first transmittance of the low-transmittance region, and
    a plurality of areas in which proportions of the high-transmittance region to the low-transmittance region are different from each other.

2. The lidar cover according to claim 1, wherein
    the high-transmittance region is an opening formed at the colored layer or a thin layer having a layer thickness thinner than that of the low-transmittance region.

3. The lidar cover according to claim 1, wherein
    a plurality of the high-transmittance regions align in a vertical direction, and each high-transmittance region extends in a horizontal direction.

4. The lidar cover according to claim 1, further comprising
    a protective layer that is formed on a surface of the transparent layer which is on a side opposite to the lidar unit, protects the transparent layer, and that allows visible light and the measurement light to transmit therethrough.

5. The lidar cover according to claim 1, wherein
    in one of the areas which is disposed so as to face a light receiver of the lidar unit, a proportion of the high-transmittance region to the low-transmittance region is higher than that of the other of the areas.

6. The lidar cover according to claim 1, wherein
    the areas has an upper area and a lower area, and
    in the upper area, a proportion of the high-transmittance region to the low-transmittance region is lower than that of the lower area.

* * * * *